United States Patent [19]
Golubev et al.

[11] 3,751,046
[45] Aug. 7, 1973

[54] FACE TYPE SEALING DEVICE

[76] Inventors: Alexei Ivanovich Golubev,
Gorokhovsky pereulok, 4, kv. 32;
Vitaly Viktorovich Gordeev, ulitsa
Parshina, 21, korpus 2, kv. 10; **Boris
Sergeevich Goritsky,** proezd
Shokalskogo, 29, korpus 1, kv. 4;
Grigory Markovich Friedisman,
ulitsa Dybenko, 22, korpus 1, kv. 24,
all of Moscow, U.S.S.R.

[22] Filed: Apr. 28, 1972

[21] Appl. No.: 248,527

[30] Foreign Application Priority Data
July 30, 1971 U.S.S.R............................. 1680964

[52] U.S. Cl. ................................................. 277/88
[51] Int. Cl. ............................................ F16j 15/36
[58] Field of Search .................. 277/81, 88, 89, 90,
277/94, 95

[56] References Cited
UNITED STATES PATENTS
2,994,547  8/1961  Dolhun et al. ........................ 277/88
3,026,114  3/1962  Andresen et al. ................. 277/88 X
3,029,081  4/1962  Marsh .............................. 277/88 X Primary Examiner—Samuel B. Rothberg
Assistant Examiner—Robert I. Smith
Attorney—John C. Holman et al.

[57] ABSTRACT

The face type sealing device includes sealing rings of which one is mounted about the shaft and the other one is stationary and is pressed to the first ring by a pressing member. The latter is sealed away from the fluid being sealed by the device with the help of a single-corrugation bellows and is mounted intermediate of the housing of the device and a sleeve. One end of the sleeve has cut therein a groove for receiving and supporting the corrugation of the bellows, whereas the opposite end of the sleeve has mounted thereon a resilient member, whereby positive fluid-tight sealing away of the pressing member is ensured.

1 Claim, 1 Drawing Figure

PATENTED AUG 7 1973 3,751,046
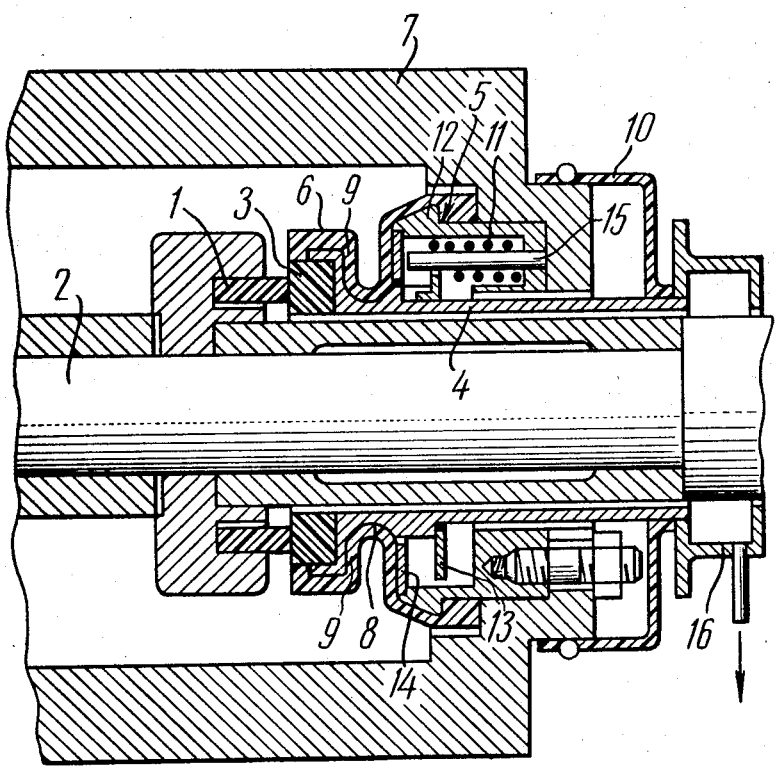

FACE TYPE SEALING DEVICE

The present invention relates to face type sealing devices used for sealing of the ends of rotatable shafts.

The present invention can be employed to utmost advantage for sealing liquids having solid particles suspended therein.

There is a known structure of a face type sealing device, adapted for operation with liquids of various kinds, disclosed in the British Pat. No. 876,728, Cl. 122 (5). This known face type sealing device comprises a rotatable sealing ring mounted about a shaft and a stationary sealing ring pressed against this rotatable sealing ring under the effort of the springs of a pressing member sealed away from the liquid that is being sealed by said sealing device by means of an elastic bellows of a cylindrical shape, the axial mobility of said bellows being provided for by the elasticity of the material from which the bellows is made. The bellows is rigidly mounted in the housing of the sealing device and is tightened about an axially movable sleeve, said sleeve having mounted therein the abovementioned stationary sealing ring.

In the above specified known structure of the face type sealing device the bellows acts as an important structural member because, in addition to the sealing function thereof, it participates in the transmission of the axial effort from the pressing member to the sealing rings, which fact substantially curtails the life of the bellows and adversely affects the reliability of the sealing device, as a whole.

Furthermore, the employment of the bellows having the configuration it has in the above specified known sealing device, wherein the axial mobility of the bellows is limited considerably by the eleasticity of the material from which the bellows is made, presents serious obstacles, when the sealing device of the abovespecified known type is used for sealing fluids under gauge pressure.

It is commonly known that throughout the operational life of face type sealing devices the part of the liquid being sealed, that might bleed between the sealing rings, may harm the component parts of the pressing member, particularly, the springs of the latter. When a liquid being sealed is apt to crystallize in the ambient air, after a certain period of operation the pressing member might get clogged with the salts of the liquid and thus lose its mobility. When a liquid being sealed contains abrasive particles, the pressing member becomes subject to abrasive wear. Similar abrasive action might be exerted upon the pressing member by abrasive particles settling upon the pressing member from the ambient air, when the latter is fairly dust-ridden.

The art of sealing also knows the structures of face type sealing devices having multi-corrugation bellows adapted to seal away the pressing member; however, the use of such structures for sealing various liquids including those having solid particles is limited either by the pressure of the liquid being sealed, or else by insufficient wear resistance of the material of the bellows. Among such known structures are those having either a multi-corrugation metal bellows or a bellows made of fluoroplastics.

It is an object of the present invention to improve the structure of the pressing member.

It is another object of the present invention to create a face type sealing device that should be durable and reliable in operation, due to the positive sealing away of the pressing member.

These and other objects are attained in a face type sealing device comprising sealing rings of which one is mounted on a rotatable shaft and another one is stationary and is pressed against said rotatable ring with the help of a pressing member sealed away from the fluid being sealed by said sealing device with the help of a bellows, said pressing member being mounted intermediate of the housing of said sealing device and a sleeve, said sleeve being axially movable and carrying said stationary ring, in which sealing device, in accordance with the invention, said sleeve has a supporting groove cut therein adjacent to one end thereof, the opposite end of said sleeve projecting beyond said housing and having mounted thereon a resilient member providing sealing away of said pressing member, said bellows being a single-corrugation one, said corrugation thereof being received in said supporting groove. The presence of the sleeve having adjacent to one end thereof the groove for supporting the corrugation of the bellows and having the resilient member mounted on the opposite end thereof provides for positive fluid-tight sealing away of the pressing member. Moreover, in the herein disclosed sealing device the bellows closely follows the contour of the other parts of the sealing device, whereby the pressure of the liquid is transmitted directly upon these parts. Thus, the bellows, as an individual structural member, is relieved from the action thereupon of this pressure, which steps up the durability of the bellows. The provision of the corrugation in the bellows makes it possible to employ the latter for creating a required specific pressure upon the sealing rings engaging each other.

The present invention will be better understood from the following description of an embodiment thereof, with reference being had to the accompanying drawing illustrating an axially sectional view of a face type sealing device embodying the invention.

Referring now in particular to the appended drawing, the face type sealing device includes a rotatable sealing ring 1 mounted about the shaft 2, a stationary sealing ring 3 mounted in a sleeve 4, a pressure member 5 sealed away from the fluid which is being sealed by the herein disclosed sealing device by a bellows 6, the member 5 being mounted intermediate of the housing 7 and the axially movable sleeve 4. The sleeve 4 has cut therein adjacent to one of its ends a supporting groove 8 adapted to support the concave portion 9 of the bellows 6, the bellows being made of an elastic material. The opposite end of the sleeve 4 has mounted thereon a resilient member 10. The opposite, free ends of the bellows 6 and of the resilient member 10 are rigidly attached to the housing 7.

The employment in the herein disclosed sealing device of parts (i.e., of the sleeve 4 and of the pressure member 5) of which the contour closely follow and ajoin the internal contour of the elastic bellows 6 has made it possible to relieve the bellows, as the structural member of the device, from the action thereon of the pressure of the liquid being sealed.

The pressure member 5 is an assembly including compression springs 11 mounted in a carrier 12, a thrust ring 13 through which the pressure is transmitted to the abovementioned sealing ring, a centering ring 14 by which the pressure member 5 is properly positioned in the housing 7 and a cylindrical pin 15 adapted to take up the friction forces.

The pressure member 5 ensures positive permanent engagement of the respective adjacent faces of the rotatable sealing ring 1 and of the stationary sealing ring 3, which engagement is, in fact, the essence of the fluid-tightness of the herein disclosed sealing device, the effort of the springs 11 of the pressure member 5 being transmitted directly to the stationary sealing ring 3, the bellows 6 not participating in the transmission of this effort.

Should any amount of the liquid being sealed manage to bleed between the adjacent engaging faces of the stationary ring and of the rotatable one, it would find its way into the collector 16, the resilient sealing member 10 preventing the flow of this accumulated liquid into the pressure member 5, through the space intermediate of the housing 7 and the sleeve 4.

What we claim is:

1. A face type sealing device, comprising: a housing; a shaft received in said housing; a rotatable sealing ring mounted about said shaft; a sleeve mounted within said housing and movable in the axial direction; another sealing ring, said another sealing ring being stationary, said another sealing ring being mounted in said sleeve and being pressed toward said first mentioned ring for forming a sealing pair therewith; means for pressing said stationary sealing ring against said rotatable sealing ring, mounted intermediate of said housing and said sleeve and sealed away with the help of a single-corrugation bellows; a groove positioned intermediate of said stationary sealing ring and said pressing means, cut in said sleeve adjacent to one end thereof, said groove being adapted to receive therein said single corrugation of said bellows for relieving said bellows from the action of the pressure of the fluid being sealed; a resilient member mounted on the opposite end of said sleeve, projecting beyond said housing, said resilient member being adapted to effect positive fluid-tight sealing of said pressing means.

* * * * *